Aug. 16, 1960 R. KÜHN 2,948,926
MOLD FOR AND A METHOD OF PRODUCING LARGE
BODIES OF FOAMED POLYSTYRENE
Filed Nov. 8, 1957

United States Patent Office 2,948,926
Patented Aug. 16, 1960

2,948,926

MOLD FOR AND A METHOD OF PRODUCING LARGE BODIES OF FOAMED POLYSTYRENE

Richard Kühn, Grunstadt, Pfalz, Germany, assignor to C.I.C.O.M.I. Compagnie Internationale pour le Commerce et l'Industrie, Luxembourg, Luxembourg, a company of Luxembourg Filed Nov. 8, 1957, Ser. No. 695,301

4 Claims. (Cl. 18—39)

The invention relates to a method and mold for economically producing large rectangular blocks of foamed polystyrene.

It is conventional procedure to soften expandable styrene polymerisate in the form of small grains by heating in a water bath or by treatment with steam or hot air and to pre-foam it into loose pearls of greater diameter. These pre-foamed pearls are then introduced into a mold with perforated walls, reheated and expanded by flowing steam after closure of the mold, until the interstices between the pearls are filled. The result is that the pre-foamed pearls weld together at their contacting surfaces and upon cooling, form a block of equal dimensions to those of the mold.

However, it is difficult to produce big blocks of large dimensions wtih a homogeneous, uniform structure economically in this way because it is necessary to heat the unit for only a short time while maintaining a very uniform distribution of heat and pressure throughout the porous body and then after the heating and expansion, cooling the blocks at a relatively low rate. Sufficiently uniform heating and distribution of heat in the material has been found to be possible only when the porous body to be manufactured has a thickness not exceeding 30 cm. Even when a flat mold of this size is used, the structure of the blocks is often unhomogeneous because the pressure in the filled mold is not uniform and the material tends to agglomerate, especially on non-uniform filling of the mold, and in such cases unforeseen pressures can occur at individual points of the mold during heating and expansion of the material which not only impairs the structure of the blocks, but leads to destruction of the mold.

For making such massive blocks of foamed material, it has been the practice hereofore to use re-coolable flat platen presses or to heat the pre-foamed material in pressure-tight vessels in an autoclave chamber. The quantity which could be produced in one operation was, however, limited because the slow cooling necessary to ensure homogeneity of the product took a considerable time and the complicated and expensive flat molds could not be used for new manufacture during this time. Exchangeable inserts have been utilized in an attempt to overcome this difficulty in such presses with the material being cooled away from the press after removal of the insert from the mold but these inserts have not been successful. It is recognized that since charging, heating and pressing are performed quickly a large number of sufficiently pressure-tight and heavy inserts are required and moreover, have to be moved.

The present invention is directed to novel apparatus as well as a more economical method of manufacturing large, homogeneous rectangular blocks of foamed polystyrene by the use of a mold of special construction which renders the use of pressure-tight inserts unnecessary with their associated expenditure of cost and time. The instant apparatus is easy to operate and enables the maximum quantity of material to be formed into large blocks of foamed polystyrene in one operation. According to the invention the large foamed polystyrene bodies of rectangular shape are manufactured in a mold which is divided by perforated parallel partitions into a plurality of molding chambers, the partitions in the mold preferably being freely movable in a direction normal to their main surfaces so that the pressure arising on heating and expansion of the material is equalized between the molded bodies.

Such a multiple mold may have varying sizes and is divided by a selected number of perforated parallel partitions into a corresponding number of chambers each about 30 cm. in width.

To facilitate removal of the molded bodies after cooling, the mold may have a hinged cover and two adjacent side walls of the mold hinged to the two other side walls. These hinged side walls can be held detachably together by releasable locking means. Other releasable locking means may conveniently be used to secure the hinged side walls to the bottom, and the cover to the side walls of the mold.

By combining several separate molding chambers in one mold resistant to the expansion pressure of the material being molded, the weight of the apparatus necessary for molding a given quantity of material, and the heat absorbing mass of the mold may be considerably reduced. Since the partitions are heated from both sides, only a small amount of condensate is produced during heating of the press with steam and likewise, very little moisture is introduced into the mass within the filled mold which would otherwise hinder welding together of the grains. Since the partitions, and also the walls of the mold which serve for the introduction of, as well as the exit of the steam are perforated, the initially crumbly mass is rapidly traversed by the steam and any condensate is driven out of the mold. Upon expansion of the mass, which occurs almost instantaneously when the material reaches its softening temperature, a substantial and generally non-uniform loading is applied to the mold but this is equalized within the molded bodies by the slightly movable partitions on which the lateral pressure on one block is balanced by lateral pressure of the adjacent block in the opposite direction. Thus the pressure in the mold is well distributed so that there is no possibility of local excess pressure which would otherwise arise and destroy the uniformity of the product in the case of manufacture of large blocks in separate individual flat molds.

The multiple mold according to this invention is also particularly advantageous because of the slow and uniform cooling obtained of the material. While bodies formed in individual flat molds generally cool rather rapidly because of their small heat capacity and thereby causing internal stresses, in the present case the total amount of material in the mold is several times greater than the flat molds and the heat capacity is correspondingly greater. Also the heat is conducted by the partitions and distributed between the adjacent foamed bodies and this provides further equalization. The particularly large quantity of material molded in one operation permits slow cooling without the process becoming uneconomical because of the mold standing with the material therein for a somewhat extended period.

The drawings show one example of a mold according to the invention:

Figure 1:
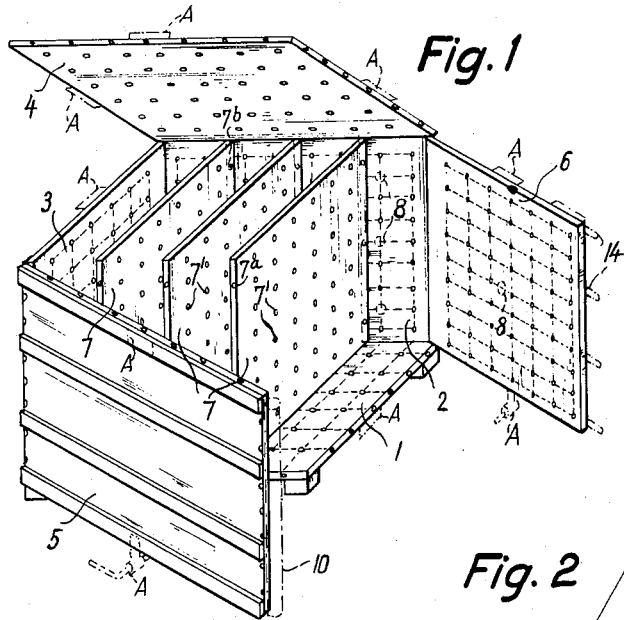
Figure 1 is a front perspective view of the mold with the sides and top illustrated in slightly open disposition and the normal positions of the locks being shown in dotted lines.
Figure 2:
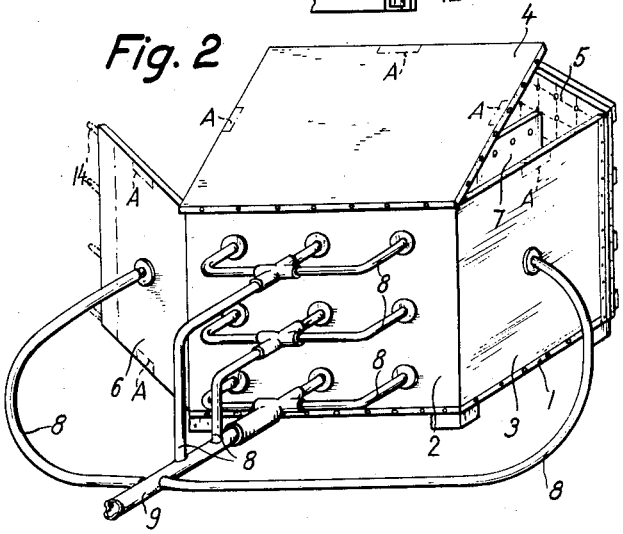
Fig. 2 is a rear perspective view of the open mold showing the steam pipes.

The mold shown in Fig. 1 has a bottom 1, rigidly connected to the rear wall 2 and one side wall 3, a cover 4 hinged to the rear wall 2 and two other side walls 5 and 6 which are in turn hinged to the fixed walls 3 and 2, respectively. Inside the mold are three parallel perforated partitions 7 which divide the mold into four vertical chambers of equal size. As shown in Fig. 2, steam pipes 8, branched from a main steam line 9, are connected to the rear wall 2 and the opposite side walls 3 and 6, the steam pipe of the latter being flexible to allow movement of wall 6. The inner surfaces of the bottom, cover and of the side walls are perforated and provided with internal channels communicating with the perforations.

At the start of the operation side walls 5 and 6 are moved to closed positions, while cover 4 is maintained in an open position whereupon the chambers thereby presented are filled with pre-foamed polystyrene pearls. Cover 4 is then locked down and the mold is charged with steam by opening the steam cock. The steam rushes suddenly into the mold through the holes of walls 2, 3 and 6 and expands uniformly therein through the perforations 7' in the partitions 7, penetrating and heating the material. Preferably bottom 1, wall 5 and cover 4 which are not provided with steam feeding pipes, have open-ended internal channels communicating with the interior of the mold by a series of openings in the inner surface of respective bottom 1, wall 5 and cover 4 to thereby permit steam to flow continuously out through such channels, the required heating of the material being effected by the flowing steam. After heating for only a few seconds the steam cock is closed and the mold and its contents are allowed to cool slowly and uniformly. When the molded blocks have attained sufficient rigidity, the cover 4 and the movable side walls 5 and 6 are opened and the blocks of foamed polystyrene are removed.

To permit equalization of the expansion pressure of the pre-foamed material in the closed mold, the three partitions 7 are connected at their vertical edges by means of inwardly projecting pins 7b of the outer mold walls received by respective elongated horizontal slots 7a in the partitions of the mold, the partitions thus being freely reciprocal according to the length of their slots thereby permitting the partitions to move in relation to one another.

Figure 4:
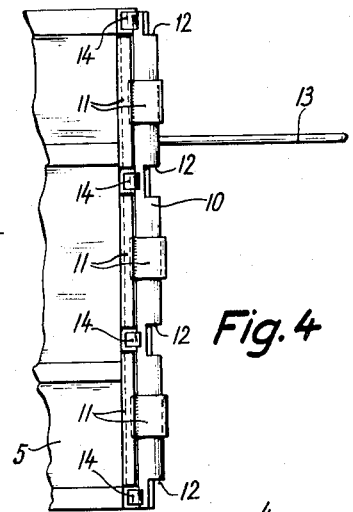
Fig. 4 shows the same locking means on a reduced scale and in elevation.
Figures 1A, 1B:
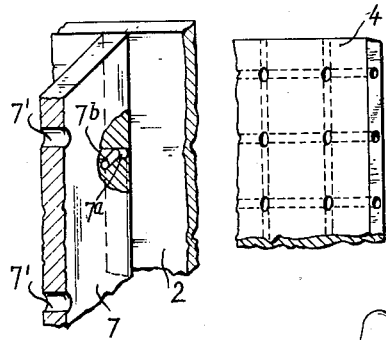
Fig. 1a is an enlarged, fragmentary, perspective view of the rear end of one partition.
Fig. 1b is an enlarged, fragmentary, perspective view of the interior surface of the cover.
Figure 3:
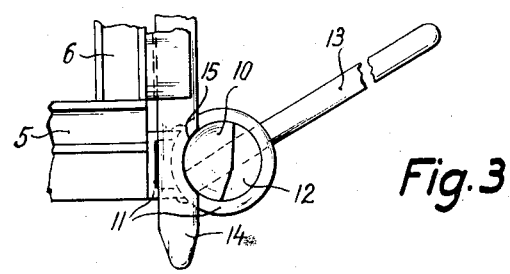
Fig. 3 is a fragmentary plan view of the locking means for interconnecting two adjacent hinged walls of the mold.

The locks for securing walls 5 and 6 and cover 4 in closed positions must be capable of withstanding the high expansion pressure of the heated contents of the mold and must be easily and quickly operable. To this end the hinged walls 5 and 6 are provided at their adjacent ends with locking means such as shown in Figs. 3 and 4. On the edge of wall 5 is a vertical shaft 10 rotatably mounted in bearings 11 and having cut-away portions 12 and carrying a handle 13. At the level of the cut-away portions 12, the edge of wall 6 carries projections 14 having round lateral recesses 15 at their outer side. To engage the lock, the handle 13 is first turned to bring the cut-outs 12 to a position facing the mold and the projections 14 are then engaged in these cut-outs. The shaft 10 is then turned back to bring the solid parts of the shaft into the round lateral recesses 15 of the projections 14. At the points of engagement the full cross-section of the shaft 10 can be somewhat offset so that in the locking position of the shaft the two walls of the mold are also locked in the longitudinal direction of the shaft and so are held tightly against pressure in all directions.

Figure 5:
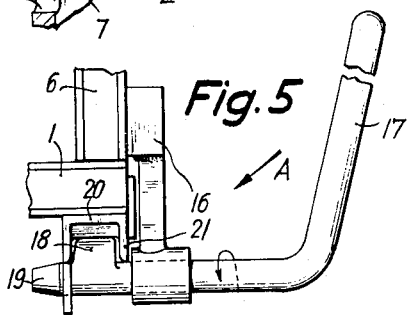
Fig. 5 shows a different form of a locking means for locking the cover to the side walls and the hinged side walls to the bottom of the mold.

One of the locks employed to releasably secure the movable side walls to the bottom 1 and cover 4 is illustrated in Fig. 5. A bracket 16 forming a part of each of the defined locks is provided at spaced intervals on the upper and lower edges of each of the movable walls 5 and 6 as indicated by dotted lines in Figs. 1 and 2, each bracket 16 in turn rotatably mounting a hand lever 17. Eccentrics 18 carried by and extending laterally from the end of each of the hand levers 17 inside brackets 16, are disposed to be received in corresponding channel sections 20 on cover 4 and bottom 1 upon swinging of levers 17 to positions moving eccentrics 18 into corresponding channel sections 20. Pins 19 comprising outwardly projecting, coaxial extensions of each end of the hand levers 17 carrying eccentrics 18 are adapted to be received in corresponding guide holes in respective channel sections 20 whereby the leg of each channel section 20 receiving pins 19 serves as an additional fulcrum member during swinging of levers 17 in directions to move eccentrics 18 into channel sections 20. In this respect it is to be noted that the legs of channel sections 20 normally proximal to brackets 16 are narrower than the legs receiving pins 19, to thereby clear hand levers 17. The lock illustrated in Fig. 5 is particularly advantageous in that it provides a firm interconnection between the movable components resistant to pressure in all directions.

The invention is limited only by the scope of the appended claims and not to the above described details of the multiple mold or of its locks.

I claim:

1. A method of manufacturing large rectangular blocks of foamed thermoplastic synthetic resin material comprising the steps of introducing small, pre-foamed particles of said material into a box-like mold subdivided by parallel vertical plane partitions into a plurality of adjacent rectangular parallel chambers the separating partitions of which being movably mounted for restricted displacements normal to their main surfaces, subjecting the material within said chambers substantially simultaneously to flowing steam at a sufficient temperature to heat and thereby expand the material, equalizing the pressure of the material during expansion thereof within said chambers by free displacement of said partitions removing excess steam from the chambers, discontinuing passage of the steam to said chambers after the material has expanded to a coherent mass filling said chambers, and cooling the expanded material within the mold to room temperature at a relatively slow rate to obtain a homogeneous structure of the formed blocks.

2. A mold for the manufacture of large rectangular blocks of foamed polystyrene by heating and expanding pre-foamed material under the influence of steam comprising an outer cubical mold frame composed of two adjacent side walls rigidly connected to the mold bottom, two further adjacent side walls each of which being articulated to one of said rigid side walls, a cover equally articulaed to one of said rigid side walls, means for locking said articulated side walls to each other and to the bottom and for locking said articulated cover to the mold frame when being in closed position, a plurality of parallel perforated vertical partitions within the mold frame extending from the mold bottom to the mold cover for subdividing the mold into a plurality of chambers of substantially equal dimensions serving as expansion chambers for the development of the expandable material under the influence of heat, said vertical partitions being loosely connected to opposite side walls of the mold frame by means allowing a restricted reciprocal movement of the partitions in horizontal direction normally to their main surfaces, and means for connecting at least some of the side walls of the mold frame to a steam connection supplying hot steam into the mold for the development of the material to be expanded.

3. A mold according to claim 2 wherein the means for connecting the mold to a steam supply includes a plurality of conduits connected to that rigid side wall of the mold frame which is extending normally to the vertical internal movable partitions, and further conduits connected to the adjacent side walls lying opposite to each other and parallel to said partitions when the mold is closed.

4. A mold according to claim 2 the cubical inner space of which is subdivided by three vertical perforated partitions of restricted movability in normal direction to their main surfaces into four chambers of about 30 cm. in width, the cubical mold frame thus having a volume of more than one cubic meter.

References Cited in the file of this patent

UNITED STATES PATENTS

| | | |
|---|---|---|
| 865,733 | Weagant | Sept. 10, 1907 |
| 942,092 | May | Dec. 7, 1909 |
| 1,005,369 | Tnohy | Oct. 10, 1907 |
| 1,567,243 | Clouser | Dec. 29, 1925 |
| 1,925,733 | Pandolfi | Sept. 5, 1933 |
| 1,948,989 | McEwan | Feb. 27, 1934 |
| 2,041,377 | Schwarz | May 19, 1936 |
| 2,175,715 | Denning | Oct. 10, 1939 |
| 2,483,286 | Kelley | Sept. 27, 1949 |
| 2,500,866 | Ramsay | Mar. 14, 1950 |
| 2,787,809 | Stastny | Apr. 9, 1957 |

FOREIGN PATENTS

| | | |
|---|---|---|
| 96,340 | Sweden | July 25, 1939 |

OTHER REFERENCES

Koppers Co. Inc., "Dylite-expandable-polystyrene," pp. 22–23, 1954.